Figure 1:
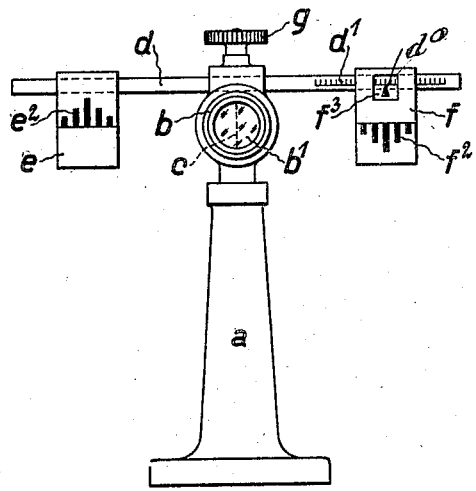

Jan. 20, 1925.  1,523,528
O. HENKER
INSTRUMENT FOR MEASURING THE CURVATURES OF THE CORNEA
Filed May 22, 1923

Inventor:
Otto Henker

Patented Jan. 20, 1925.

1,523,528

UNITED STATES PATENT OFFICE.

OTTO HENKER, OF JENA, GERMANY, ASSIGNOR TO THE FIRM CARL ZEISS, OF JENA, GERMANY.

INSTRUMENT FOR MEASURING THE CURVATURES OF THE CORNEA.

Application filed May 22, 1923. Serial No. 640,727.

*To all whom it may concern:*

Be it known that I, OTTO HENKER, a citizen of Germany, and residing at Jena, Germany, have invented a new and useful Instrument for Measuring the Curvatures of the Cornea (for which I have filed an application in Germany, June 3, 1922), of which the following is a specification.

The present invention relates to instruments destined for the measurement of the curvatures of the cornea and based upon the well-known principle of measuring the magnitude of the image of an arrangement of marks reflected by the surface of the cornea by means of a microscope which with the aid of deflecting systems brings about in the meridian to be examined a reduplication of the reflected images. Especially those instruments are in question in which the deflecting systems used for reduplicating the image are rigidly disposed and yield an invariable angle of deflection. As a rule, in order to also be able to determine the conditions of curvature of astigmatic surfaces of the cornea, these instruments are so constructed that the measurement can simultaneously be effected in two meridional planes, perpendicular to each other, of the eye. Hence, in most cases there are used four marks which lie in pairs symmetrically to the axis of the observation microscope on two diameters perpendicular to each other and which are disposed jointly rotatable about the microscope axis. When measuring it is necessary to bring (with spherical surfaces of the cornea in an optional meridian, with astigmatic ones in the two principal directions of intersection) two pairs of images each belonging together into a definite relative position, e. g. into such a position that the two double images of the distance given by two marks appertaining to one another just come in contact with each other and from the resulting distance of the marks from the microscope axis there is attained a magnitude valid for the curvature sought of the cornea. In the instruments of this kind hitherto known the displacement of the marks always takes place in such a way that their distance from the eye to be examined remains unchanged, i. e. the marks are displaced on a sphere approximately concentric with the centre of curvature of the corneal surface. This arrangement of the marks has the drawback that the connection between the displacement of the marks and the alteration of the retractive power of the corneal surface corresponding to the same is not linear with sufficient approximation. Hence, if it be desired to figure the reading scale, indicating the displacement of the marks, according to refractive powers of the corneal surface, an unequal division is attained. It is further well known to construct the marks in the shape of stairs or the like in such a way as to be able with a given adjustment of the marks to read off the refractive power directly from the relative position of two mark images appertaining to each other provided they overlap one another. Since, however, in the known instruments there is no linear connection between the position of the marks and the appertaining refractive power, it is also impossible to gather any exact indications about the refractive power from the amount of overlapping of two mark images belonging together. For, the measure serving for utilizing the overlapping is no fixed magnitude but varies according to the distance from the microscope axis. Hence, by using nevertheless the invariable stairs of the marks as a measuring unit, inexact values are obtained. According to the present invention these drawbacks are obviated by not disposing the marks displaceably on a sphere but in a plane perpendicular to the axis of the observation microscope. One thus practically obtains a linear connection between the distances of the marks from the microscope axis and the corresponding refractive powers of the corneal surfaces, and therefore an equal division, and the reading of refractive powers from the overlapping of the image furnishes correct indications.

Figure 2:
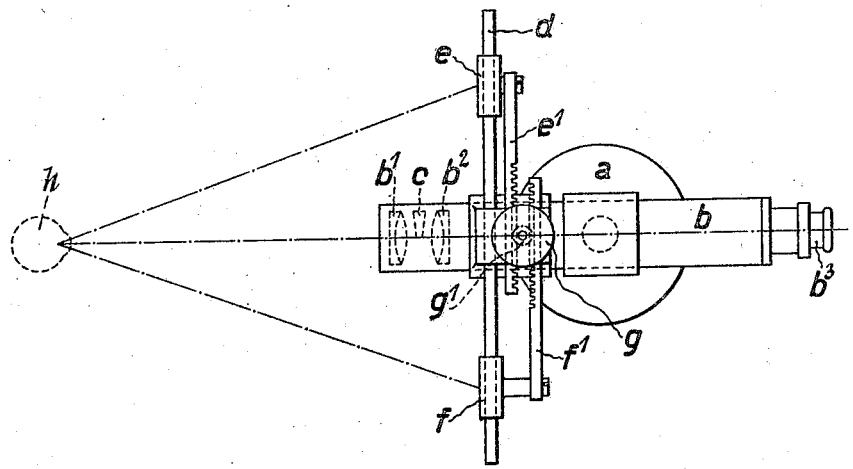

The annexed drawing diagrammatically shows an instrument according to the present invention. Fig. 1 is a front view of the instrument as viewed from the eye to be examined; Fig. 2 is a plan elevation in which also the eye to be examined is shown by dotted lines.

An observation microscope $b$ fixed on a standard $a$ is provided with a two-membered objective $b^1$, $b^2$, between whose two members a refractive glass wedge $c$ is rigidly disposed. The wedge $c$ only covers one half of the entrance surface of the rays so that to an observer, looking into the ocular $b^3$ of the microscope, two images are simultaneously visible, viz, an image seen directly and an image deflected according to the refractive angle of the wedge $c$. On the microscope $b$ there is fitted a guide ruler $d$ along which two slides $e$ and $f$ can slide in a plane perpendicular to the microscope axis. Each of the two slides $e$ and $f$ is coupled to a rack $e^1$ and $f^1$ respectively, which are capable of being moved by means of a common pinion $g^1$ connected with a milled head $g$, so that both slides $e$ and $f$ are always displaced symmetrically to the microscope axis. Upon the plane front surfaces of the slide $e$ and $f$, facing the eye $h$ to be examined, is disposed a mark system each $e^2$ and $f^2$ respectively, which in a similar way as with the known constructional forms are constructed and graduated in such a way that from the relative position of the images of these mark systems in the field of view of the ocular it is possible to read off directly the refractive power of the cornea. Besides, on the guide ruler $d$ there is a scale $d^1$, whose appertaining reading index $d^0$ is disposed in a window-shaped opening $f^3$ of the slide $f$. The figuring of the scale $d^1$ may be so chosen that the refractive power of the corneal surface can also be read off directly.

The operation of the instrument is as follows. If the instrument be directed upon the eye to be examined, the mark systems $e^2$ and $f^2$ are reflected at the surface of the cornea which acts as a convex mirror. For well-known optical reasons the reflected images are the smaller and the closer together, the smaller is the radius of curvature of the cornea. Hence the distance apart of the two reflected images is a measure for the curvature and therefore also for the refractive power of the cornea. Owing to the action of the wedge $c$ the observer sees of each of the mark systems two reflected images. Thereupon the observer adjusts with the aid of the milled head $g$ the slides $e$ and $f$ until the one reflected image of $e^2$ is approximately above the one reflected image of $f^2$ and thereby a division of the scale $d^1$ coincides with the index $d^0$. This division then indicates the units of the refractive power. The fractions will be known from the degrees of the mark systems $e^2$ and $f^2$ which are superposed at any one time (if, e. g. the second degree of $e^2$ coincides with the second degree of $f^2$, the fraction is two-tenths).

I claim:

Instrument for measuring the curvatures of the cornea containing a rigidly disposed deflecting system of invariable deflection and marks displaceably disposed symmetrically to the axis of the observation microscope, characterized by the feature that the marks are displaceably disposed in a plane perpendicular to the axis of the observation microscope.

OTTO HENKER.